(12) United States Patent
Wu et al.

(10) Patent No.: US 10,664,420 B2
(45) Date of Patent: May 26, 2020

(54) SYSTEM AND METHOD FOR PORT-TO-PORT COMMUNICATIONS USING DIRECT MEMORY ACCESS

(71) Applicant: Avago Technologies International Sales Pte. Limited, Singapore (SG)

(72) Inventors: Kenny Wu, Saratoga, CA (US); Mark Karnowski, Huntington Beach, CA (US); James Smart, Laguna Hills, CA (US); Ravi Shenoy, Sunnyvale, CA (US); Lalit Chhabra, Fremont, CA (US); Gregorio Gervasio, Jr., Santa Clara, CA (US); Tuong Le, Irvine, CA (US); Vuong Nguyen, Aliso Viejo, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 0 days.

(21) Appl. No.: 15/957,264

(22) Filed: Apr. 19, 2018

(65) Prior Publication Data
US 2019/0324926 A1    Oct. 24, 2019

(51) Int. Cl.
*G06F 13/16* (2006.01)
*G06F 13/42* (2006.01)

(52) U.S. Cl.
CPC ...... *G06F 13/1673* (2013.01); *G06F 13/4282* (2013.01); *G06F 2213/0026* (2013.01)

(58) Field of Classification Search
CPC ............. G06F 13/1673; G06F 13/4282; G06F 2213/0023

USPC ......................................................... 710/310
See application file for complete search history.

(56) References Cited

U.S. PATENT DOCUMENTS

| | | | |
|---|---|---|---|
| 6,744,765 B1 | 6/2004 | Dearth et al. | |
| 7,103,888 B1* | 9/2006 | Cayton | H04L 67/1097 719/313 |
| 7,117,308 B1* | 10/2006 | Mitten | G06F 13/387 711/118 |
| 7,460,531 B2* | 12/2008 | Gupta | H04L 49/90 370/389 |
| 8,122,711 B2* | 2/2012 | Schmidt | F01N 11/00 60/297 |
| 9,158,718 B2 | 10/2015 | Blocksome | |
| 10,169,271 B1* | 1/2019 | Ahmad | G06F 13/28 |
| 2003/0014544 A1* | 1/2003 | Pettey | H04L 29/06 709/249 |
| 2005/0089033 A1* | 4/2005 | Gupta | H04L 49/90 370/389 |
| 2006/0184711 A1* | 8/2006 | Pettey | H04L 69/18 710/316 |
| 2006/0248234 A1* | 11/2006 | Pope | H04L 49/90 709/250 |
| 2007/0008985 A1* | 1/2007 | Lakshmanamurthy | H04L 49/1523 370/412 |

(Continued)

Primary Examiner — Christopher B Shin
(74) Attorney, Agent, or Firm — Sheridan Ross P.C.

(57) ABSTRACT

A system, method, and adaptor that facilitate data transmission are described. One example of the disclosed system facilitates the chip-to-chip transport of header descriptors and payloads. The system may include a source chip, a destination chip, and a set of queues describing buffer memory locations for staging header descriptors and payloads to be transferred from the source chip to the destination chip, where the set of queues are directly accessible to the source chip and to the destination chip.

20 Claims, 7 Drawing Sheets

(56) References Cited

U.S. PATENT DOCUMENTS

| | | | |
|---|---|---|---|
| 2008/0126057 A1* | 5/2008 | Jain | G06Q 10/06311 703/13 |
| 2009/0034549 A1* | 2/2009 | Soni | H04L 49/90 370/412 |
| 2015/0127763 A1* | 5/2015 | Pope | G06F 15/17331 709/212 |
| 2017/0199667 A1* | 7/2017 | Zia | G06F 3/061 |
| 2017/0351555 A1* | 12/2017 | Coffin | G06F 9/5016 |
| 2018/0181530 A1* | 6/2018 | Kantecki | G06F 13/4282 |
| 2019/0034364 A1* | 1/2019 | Lee | G06F 13/1673 |

\* cited by examiner

SYSTEM AND METHOD FOR PORT-TO-PORT COMMUNICATIONS USING DIRECT MEMORY ACCESS

FIELD OF THE DISCLOSURE

The present disclosure is generally directed toward data processing and, more specifically, toward a system and method for supporting port-to-port or chip-to-chip communications in a self-contained system.

BACKGROUND

When frames or payloads are processed by a network adaptor chip, the chip will send header descriptors and payloads to a host driver/software to proceed with the next step, such as sending the payload to an application for consumption or sending the payload out to a network through another adaptor chip. These actions require the host Central Processing Unit (CPU)/software/driver to orchestrate the transfer of header descriptors and payloads between adaptor chips. As a result, a number of negative impacts are realized including: (1) an increase in host CPU utilization; (2) an increase in latency of payload transfer; and (3) an increase in the Peripheral Component Interconnect Express (PCIe) Root Complex and host server memory bandwidth requirements.

BRIEF DESCRIPTION OF THE DRAWINGS

The present disclosure is described in conjunction with the appended figures, which are not necessarily drawn to scale.

DETAILED DESCRIPTION

Figure 1:
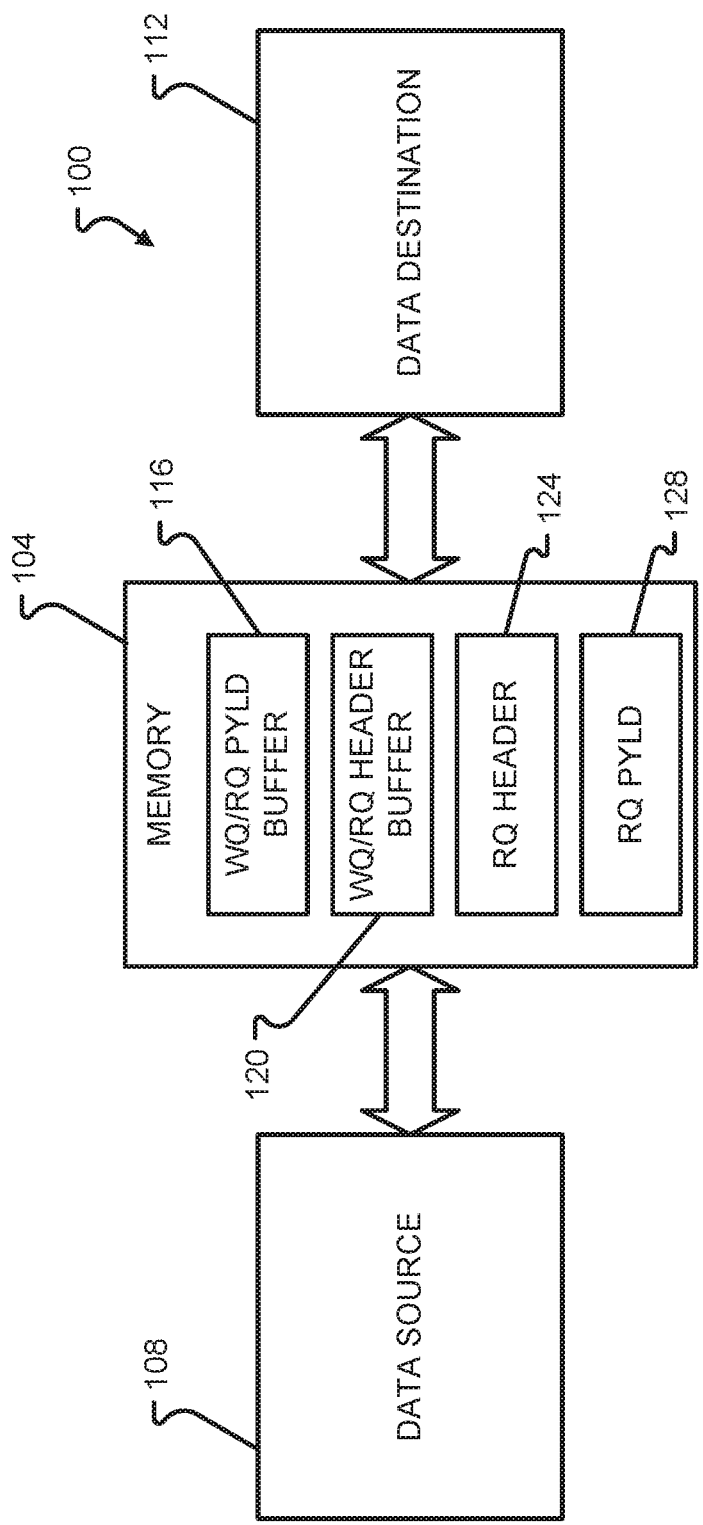
FIG. 1 is a block diagram depicting a first data transmission system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any location within a distributed network of components without impacting the operation of the system.

Furthermore, it should be appreciated that the various links connecting the elements can be wired, traces, or wireless links, or any combination thereof, or any other known or later developed element(s) that is capable of supplying and/or communicating data to and from the connected elements. Transmission media used as links, for example, can be any suitable carrier for electrical signals, including coaxial cables, copper wire and fiber optics, electrical traces on a PCB, traces in an IC chip, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any type of methodology, process, mathematical operation or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-7, various systems and methods for enabling direct data transmission between ports, adaptors, chips, or the like will be described. While particular embodiments will be described in connection with facilitating communications between network adaptor chips or network adaptor ports, it should be appreciated that embodiments of the present disclosure are not so limited.

More specifically, embodiments of the present disclosure generally relate to computer networking, storage networking, and communications, and more particularly, to enable data communications over a PCIe fabric between Fibre Channel (FC) Host Bus Adaptors (HBA) (including NVMe over FC) without software intervention. Although the embodiments depicted and described herein are shown in terms of Fibre Channel HBAs or storage adaptors, it should be understood that the claims are not so limited. Rather, embodiments of the present disclosure may additionally be applied in the context of many other adaptors that transport header descriptors and payloads from one chip to another chip such as Ethernet Converged Network Adaptors (CNA) or Security adaptors.

One application of embodiments described herein is for switching FC frames from an adaptor to another adaptor without an intervening FC switch, which can save costs in storage target systems. Other possible applications are for payload processing (with payload from host or network) such as performing T10 PI (T10 PI, formerly T10 Data Integrity Field (DIF)) insertion/deletion/checking, data compression/decompression, data encryption/decryption and so on.

Normally, a peer chip is notified with work requests via doorbells. The alternate scheme is for the peer chip to poll the next Work Queue Entry (WQE) from header buffer memory on a regular basis to determine if a new WQE has been posted by parsing a phase state bit in the WQE. A matching phase state bit in the WQE may indicate that the element is valid.

In some embodiments, the payloads that are transported may have data integrity protection built-in such as T10 PI, CRC, checksum, and so on. Each WQE can describe the payload for one frame, a large set of data, or an entire I/O operation.

One aspect of the present disclosure is to allow frames/payloads to be transported or switched in a self-contained system without host CPU/software/driver intervention. As a non-limiting example, a chip can pass header descriptors and payloads to another chip via PCIe fabric directly that bypasses host CPU/software/driver. Embodiments described herein help reduce overall CPU utilization, reduce latency, reduce Root Complex and host server memory bandwidth requirements, and reduce the overall cost of the system. For low latency solutions (e.g., NVMe over FC), it is beneficial to bypass software processing since it may become the performance bottleneck for the system.

Another aspect of the present disclosure may utilize some amount of software implementation to facilitate data transfer, but the need for a switch may be avoided. Specifically, embodiments of the present disclosure could leverage a software-based store and forward process that, when going from A-B, avoids the PCIe fabric and uses non-host memory. In one example, adaptor A could be configured to transmit to queues that exist in memory (that may or may not be connected to PCIe fabric). This memory could be local memory, local private memory, or any other memory available via the PCIe bus.

With reference now to FIG. 1, additional details of a first data transmission system 100 will be described in accordance with at least some embodiments of the present disclosure. The data transmission system 100 is shown to include a data source 108, a data destination 112, and memory 104 coupled between the data source 108 and data destination 112. The data source 108 may correspond to a data port, a source chip, a source adaptor, or any other source of information. Similarly, the data destination 112 may correspond to a data port, a destination chip, a destination adaptor, or any other consumer of information. In some embodiments, the type of device used for the data source 108 may be the same type of device used for the data destination 112. Thus, if the data source 108 is provided as an adaptor, then the data destination 112 may also be provided as an adaptor. The data source adaptor and data destination adaptor can be the same adaptor.

The memory 104 may correspond to one or more memory devices that are co-located (e.g., local) to the data source 108, one or more memory devices that are co-located (e.g., local) to the data destination 112, local private memory, or any other memory that is available via a fabric that connects the data source 108 and data destination 112. In some embodiments, the memory 104 may correspond to any type of memory device that is programmable by a host device, but is not operated by a host device. Such memory may be referred to as non-host memory. Because the memory 104 may not be under direct control of a host device, the data source 108 and data destination 112 may be required to perform DMA operations on memory 104, thereby bypassing any host resources. As used herein, the data source 108 and data destination 112 may be referred to as directly accessing memory 104, meaning that at least some host resources are bypassed in connection with directly accessing the memory 104. Direct memory access may be achieved by performing a DMA operation, which is a method that allows an data source 108 and/or data destination 112 to send or receive data directly to or from the memory 104, bypassing the host CPU.

The memory 104 is shown to have at least one payload buffer 116, at least one header buffer 120, a Header Receive Queue (RQ) 124, and a Payload RQ 128. In some embodiments, each of the components of memory 104 may be directly accessible to both the data source 108 and data destination 112. In some embodiments, the at least one payload buffer 116 comprises a Work Queue (WQ) and RQ pair describing buffer memory locations for staging payloads. The at least one header buffer 120 may comprise a WQ and RQ pair describing buffer memory locations for staging header descriptors. Both buffers 116, 120 may be created by host software when a communication path is established between the data source 108 and data destination 112. In some embodiments, the queue depth of the WQ and the RQ pair in each set of queues should be equal since the resource specified in each RQ Entry (RQE) index is associated with each WQ Entry (WQE) index.

In some embodiments, a set of queues are created in memory 104 to facilitate the transportation and exchange of header descriptors and payloads from data source 108 to data destination 112 in a self-contained system seamlessly, whereby the source 108 creates/writes header descriptors and payloads into the header buffer 120 and payload buffer 116 with DMA buffer memory addresses from the Header RQ 124 and Payload RQ 128. The source 108 notifies the destination 112 when source DMAs are complete by issuing WQ doorbells, in turn, the destination 112 fetches header descriptors from the WQ (created by the source 108) in header buffer 120 and payloads (placed by the source 108) in payload buffer 116. Lastly, the destination 112 returns RQEs/buffer resources back to the source 108 by posting and ringing RQ doorbells after header descriptors and payloads have been consumed from memory 104.

Figure 2:
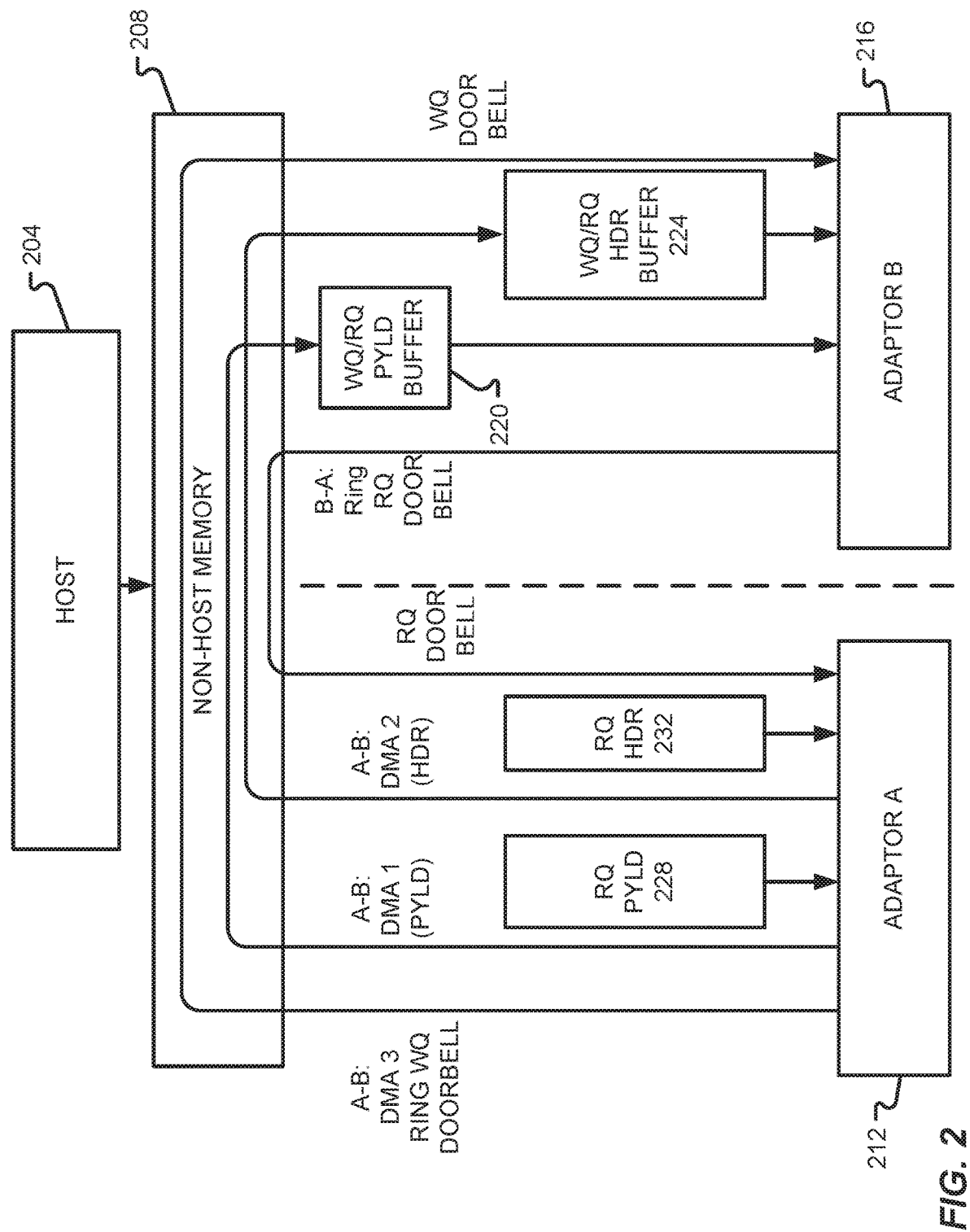
FIG. 2 is a block diagram depicting a second data transmission system in accordance with at least some embodiments of the present disclosure.

With reference now to FIG. 2, additional details of a data transfer system will be described in accordance with at least some embodiments of the present disclosure. The data transfer system may be a particular, but non-limiting, example of the system 100 depicted and described in FIG. 1. For instance, FIG. 2 depicts a non-host memory 208 that is used to transfer information from adaptor A 212 to adaptor B 216. The non-host memory 208 may correspond to an example of memory 104. The adaptor A 212 may correspond to an example of the data source 108. The adaptor B 216 may correspond to an example of the data destination 112.

In some embodiments, one or both adaptors 212, 216 may correspond to network adaptors that are provided as part of a network card or board within a host device. In other embodiments, the adaptor(s) are provided on one or more separate components from a host device. As can be appreciated, an adaptor 212, 216 facilitates the transfer of data between the host 204 and a communication network or storage area network. The adaptors may provide data/protocol translation services, addressing services, and other services. In some embodiments, the adaptors are provided as hardware devices and possibly one or more software/firmware components that convert data transmitted from one presentation format to another. For instance, the adaptor may include hardware and software/firmware components that enable data transmitted by the host to be placed onto a communication or storage area network consistent with data formatting requirements of the network. Non-limiting examples of devices suitable for adaptors 212, 216 may include or be provided as part of a network interface controller (NIC), network interface card, LAN adaptor, or physical network interface.

The host 204 may correspond to a personal computer, a laptop, a server, or any other device that includes a local processor and memory. In some embodiments, the host 204 may include a user interface that enables a user to directly interact with other hardware components of the host 204. Data connectivity between the host 204 and a network may be facilitated by one or both of the adaptors 212, 216.

The network(s) to which the host 204 connects via adaptor(s) 212, 216 may correspond to a packet-based communication network. As one non-limiting example, adaptor(s) 212, 216 may connect the host 204 to an IP-based communication network and may use communication protocols such as the Ethernet protocol. It should be appreciated that the communication network does not necessarily need to be limited to an Ethernet-based communication network, but rather any interconnected collection of computing devices using any type of communication protocol or combination of communication protocols may qualify as a communication network.

FIG. 2 further depicts a host 204 that may be in communication with the non-host memory 208. In some embodiments, the host 204 may be used to setup queues and other memory resources (e.g., tables, lists, etc.) that can be made accessible to the adaptors 212, 216 in the non-host memory 208. Once the queues and other memory resources have been established and otherwise setup by the host 204, then the adaptors 212, 216 may be enabled to transfer information between one another using solely the non-host memory 208 and bypassing the host 204 itself.

The types of queues and memory resources that may be established and otherwise setup by the host 204 within the non-host memory 208 include, for instance, a payload buffer 220, a header buffer 224, a Payload RQ 228, and a Header RQ 232. These host-generated queues and memory resources may reside in memory devices that are local to adaptor A 212, memory devices that are local to adaptor B 216, memory devices residing in a PCIe memory device, memory devices that are accessible by a fabric using DMA addressing, or combinations thereof. The payload buffer 220 may be similar or identical to payload buffer 116. The header buffer 224 may be similar or identical to header buffer 120. The Payload RQ 228 may be similar or identical to Payload RQ 128. The Header RQ 232 may be similar or identical to Header RQ 124. As shown in FIG. 2, the payload buffer(s) 220 and header buffer(s) 224 may be setup on a device local to adaptor B 216 whereas Payload and Header RQs 228, 232 may be setup on a device local to adaptor A 212. It should be appreciated, however, that such a configuration is not required and can be modified without departing from the scope of the present disclosure.

In some embodiments, each queue operates in a circular fashion with a write pointer (next entry to be written by the producer (e.g., adaptor A 212)) and a read pointer (next entry to be read by the consumer (e.g., adaptor B 216)). A queue is empty when the write pointer is equal to the read pointer. A queue is full when the read pointer is equal to the write pointer minus one accounting the modulo queue size. When a queue entry is inserted or deleted from a queue, the queue index increments by one except when it reaches the last entry of a queue. After the last entry (index=N−1, with N being the queue size) of a queue is inserted or deleted, the hardware wraps around the queue and returns the index back to the first entry (e.g., index=0) as the current queue index.

In one non-limiting example, an RQ pair incorporates a Header RQ 232 and a Payload RQ 228 that operate in lockstep. To transport a set of data (e.g., a frame), it requires the buffer 220, 224 resources indicated in a header RQE and a payload RQE. The payload RQE contains the address where the next payload will be placed by the adaptor A 212 in payload buffer memory 220.

The header RQE contains the address where the next WQE will be created by the adaptor A 212 with the next header descriptor in header buffer memory 224. The header descriptor provides information on the payload including frame header, optional header if present, and control attributes. In addition, a Phase State bit may be inserted in the header descriptor (or WQE) to determine the validity of a WQE. The adaptor A 212 may be configured to maintain a Phase State bit in an RQ control structure to track the state of the current valid phase. The value of the Phase State bit may toggle whenever the queue wraps to the index 0 for next queue incarnation.

In addition to using the queues and non-host memory 208 resources, the adaptors 212, 216 may be configured to communicate status information between one another using doorbell mechanisms. For instance, adaptor A 212 may ring a WQ doorbell with a WQ Identifier (WQ_ID) to the adaptor B 216 via a PCIe-posted memory write transaction once data placements into buffer 220, 224 memories are complete. Doorbells are used to communicate queue index updates from one adaptor to another, which are PCIe-posted memory writes to PCIe DMA addresses. A doorbell may contain a Queue ID field, and a Number of Entries Posted field or Producer Index field. Doorbell writes can be coalesced to decrease the number of PCIe transactions and to reduce overheads, which allows several WQEs or RQEs to be posted with a single doorbell write transaction.

It should be noted that the WQ doorbell (third write) may arrive at the destination (e.g., adaptor B 216) before the WQE is written in payload buffer memory 220 (first write) and header buffer memory 224 (second write) with PCIe-posted memory write transactions. When the destination fetches the WQE from header buffer memory 224, it may potentially read a stale WQE since the PCIe non-posted read request is issued from a different path at the destination using different flow control PCIe non-posted credits. The payload/WQE posting from the source (e.g., adaptor A 212) may use PCIe-posted header and payload credits. One possible method of handling this scenario is to add a Phase State bit on the last word in WQE, which is maintained in RQ control structure in adaptor A 212 for insertion and in WQ control structure in adaptor B 216 for checking the validity of the WQE. When the destination fetches a WQE with a mismatched Phase State bit in WQE (e.g., a retrieved Phase State bit that does not match with the WQ control structure Phase State bit), the action of the destination is to re-fetch the WQE until the Phase State bit in WQE matches with the Phase State bit in WQ control structure, or until it reaches a programmable number of retries before declaring a queue failure. Upon a queue failure, the queue set may be torn down and re-established.

A number of variations of RQ pairing or grouping modes are possible. As one example, a single RQ may be employed whereby each RQE set contains one header buffer address and one payload buffer address. In another variation, a single RQ may still be used, but each RQE may be configured to contain one header buffer address and a set of payload buffer addresses (e.g., 3 payload buffer addresses).

In another variation, two RQs may be used and the Header RQ may be configured to contain one header buffer address whereas the Payload RQ contains a set of payload buffer addresses (e.g., 4 payload buffer addresses). Another example of using two RQs may configure the Header RQ to contain one header buffer address and the Payload RQ may contain an address that points to a set of payload buffer addresses.

In still another variation, three or more RQs may be utilized. In this scenario, a Header RQ may be configured to contain one header buffer address and each of two or more Payload RQs may contain one payload buffer address.

A WQ, as compared to an RQ, encompasses a list of WQEs in the header buffer 224. Each WQE contains a header descriptor with information on the header, payload and control attributes. When the header descriptor and payload are placed in header buffer 224 and payload buffer 220 by the source (e.g., adaptor A 212), the source rings a WQ doorbell (via a PCIe-posted memory write transaction) to the destination (e.g., adaptor B 216) (matching the destination's PCIe Base Address Register). In turn, the destination fetches the next WQE and uses the payload buffer address in the WQE to fetch the actual payload in payload buffer 220.

The payload buffer addresses can be written by the source while WQEs are being generated. Alternatively, the payload buffer addresses can be pre-registered and populated by a driver of the adaptor(s) 212, 216 using non-translated or translated DMA addresses allowing the destination (e.g., adaptor B 216) to fetch payloads written by the source (e.g., adaptor B 216). The source chip will skip writing the payload buffer address in this alternate method. With different variations of RQ pairing and grouping modes, the payload buffer addresses can be pre-registered with the same address format.

Once the buffer memories are consumed, the destination posts a RQ doorbell with RQ Identifier (RQ_ID) to the source to facilitate the return of buffer resources indicated in header and payload RQEs back to the source. The utilization of these non-host memory 208 devices can help bypass the host 204, thereby reducing CPU utilization, reducing latency, reducing Root Complex and host server memory bandwidth requirements, and reducing costs for the overall system. It also helps ensure that the host 204 does not become the performance bottleneck during data transfer between the adaptors 212, 216.

Figure 3:
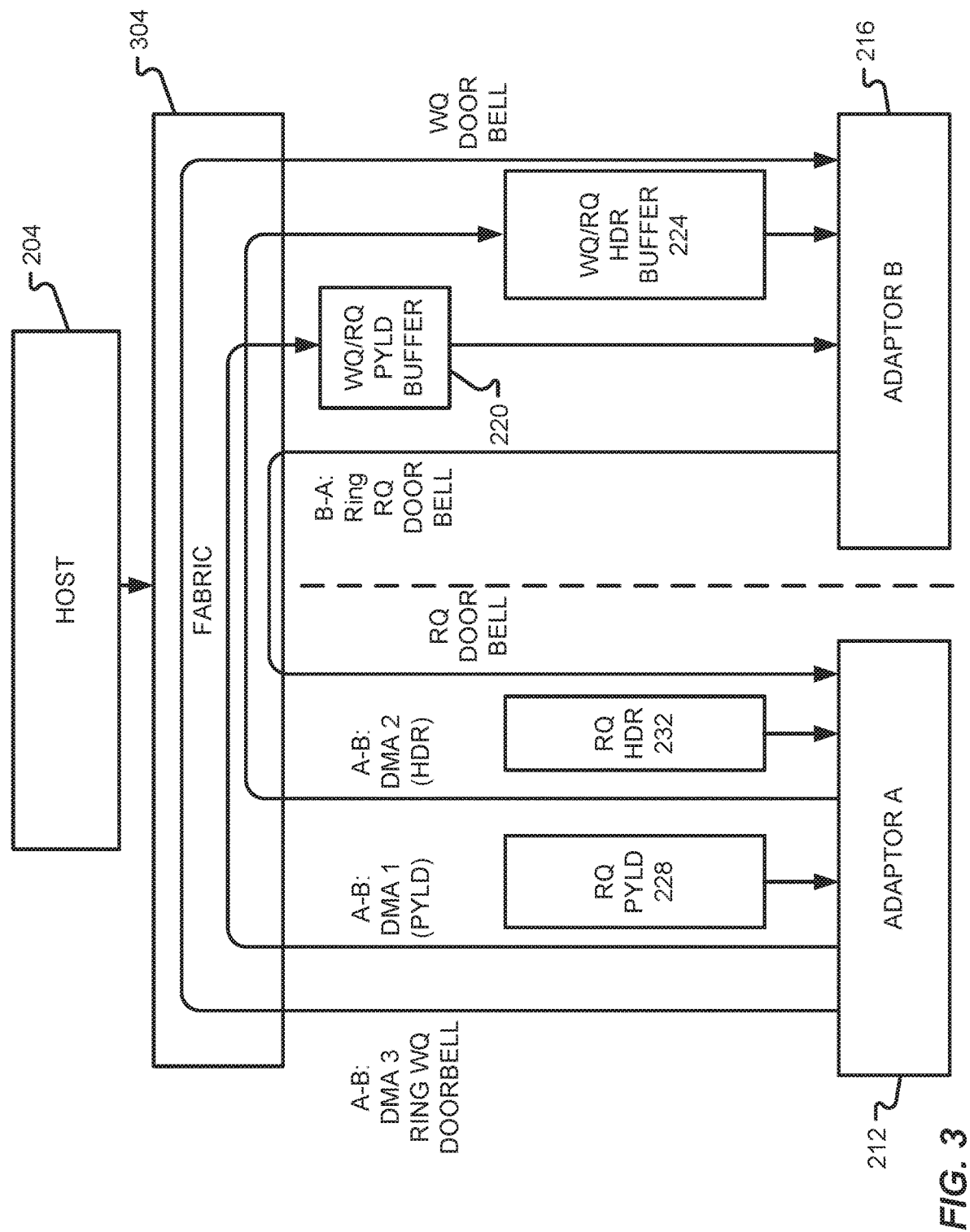
FIG. 3 is a block diagram depicting a third data transmission system in accordance with at least some embodiments of the present disclosure.

With reference now to FIG. 3, additional details of another illustrative data transfer system will be described in accordance with at least some embodiments of the present disclosure. The data transfer system may be a particular, but non-limiting, example of the system 100 depicted and described in FIG. 1 and or FIG. 2. For instance, FIG. 3 depicts a fabric 304 that is used to transfer information from adaptor A 212 to adaptor B 216. The fabric 304 may correspond to any type of fabric known to connect different network adaptors. For instance, the fabric 304 may correspond to a PCIe fabric or the like. Other components depicted in FIG. 3 are similar or identical to those shown in FIG. 2.

Figure 4:
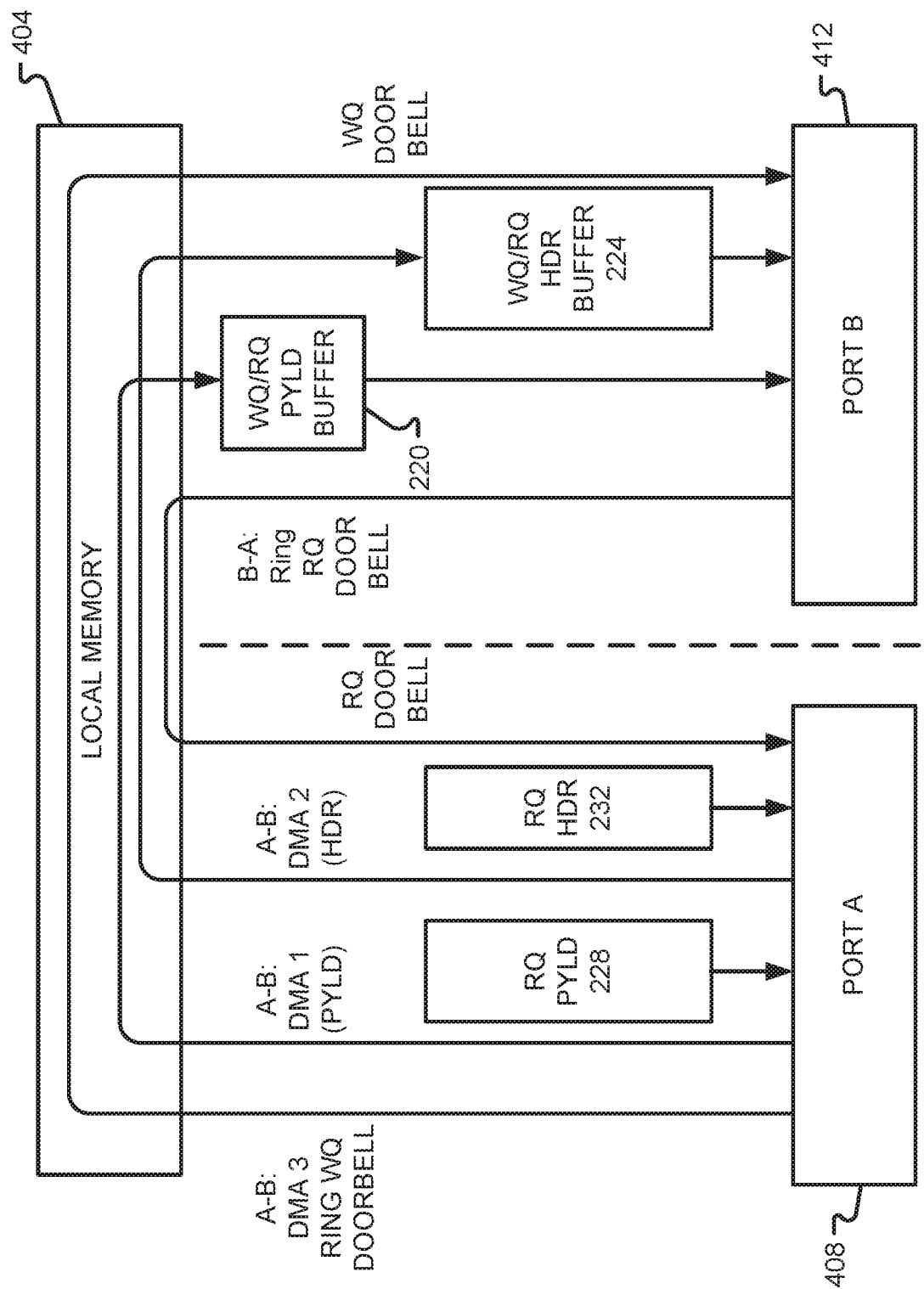
FIG. 4 is a block diagram depicting a fourth data transmission system in accordance with at least some embodiments of the present disclosure.

With reference to FIG. 4, yet another illustrative data transfer system is shown in accordance with at least some embodiments of the present disclosure. The data transfer system of FIG. 4 may correspond to yet another variation of the system 100 shown in FIG. 1. For instance, local memory 404 is shown to couple one port (e.g., port A 408) with another port (e.g., port B 412). In this scenario, the ports 408, 412 may belong to a common adaptor device, a common adaptor chip, a common PCB, or the like. The ports may be may not be physically adjacent to one another on the common/shared device. However, both ports 408, 412 may be physically connected to a common device, substrate, or contained within a common enclosure. The queues and memory resource 220, 224, 228, 232 shown in FIG. 4 are similar to the components depicted in other illustrative systems. The other difference, however, is that the local memory 404 may be co-located with both ports 408, 412. For instance, the local memory 404 may correspond to memory devices of an adaptor that includes both ports 408, 412.

Figure 5:
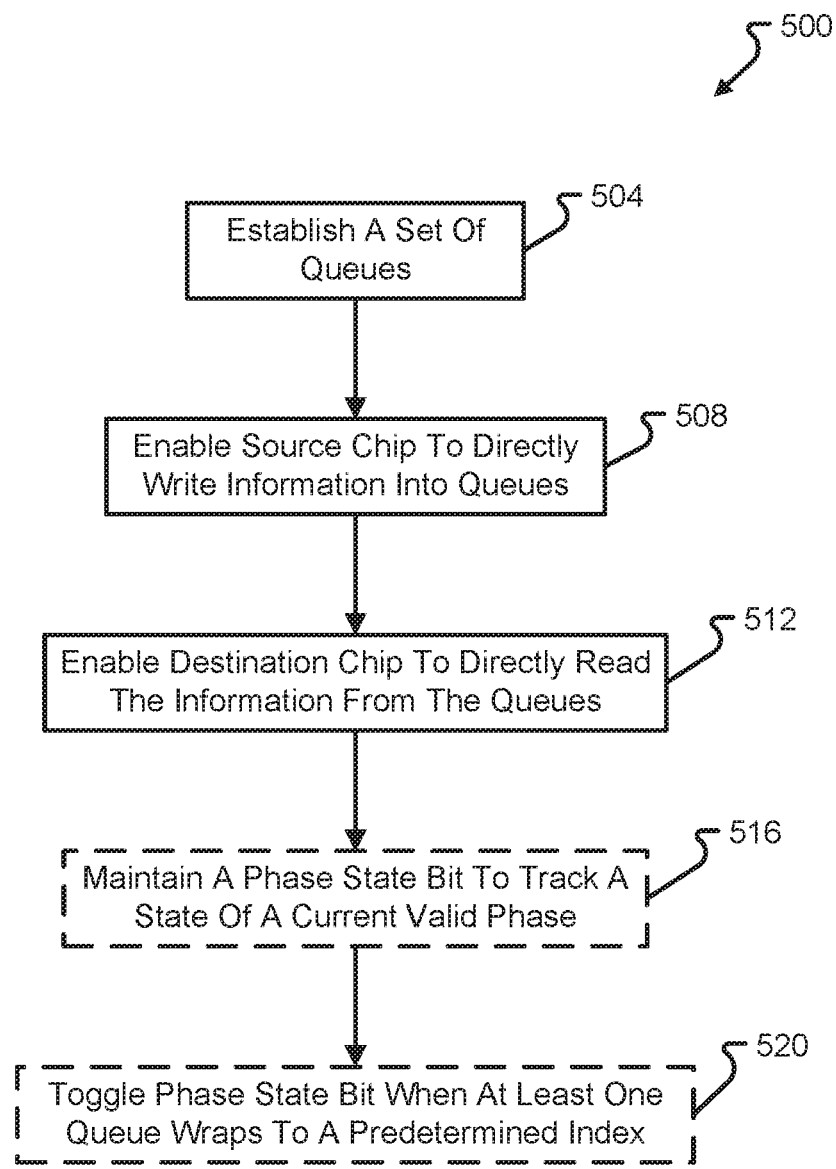
FIG. 5 is a flow diagram depicting a method of enabling chip-to-chip data transmission in accordance with at least some embodiments of the present disclosure.

With reference now to FIG. 5, a method 500 of facilitating a data transfer from a data source (e.g., a source chip) to a data destination (e.g., a destination chip) will be described in accordance with at least some embodiments of the present disclosure. Although described in connection with source and destination chips, it should be appreciated that the method(s) depicted and described herein may be applied to any type of data source and/or data destination.

The method begins with the establishment of a set of queues between the source chip and destination chip (step 504). The set of queues created between the chips may enable the transportation and exchange of descriptors and payloads between chips. The set of queues may include a WQ, RQ pair (e.g., RQ header and RQ payload), header buffer and payload buffer and a depth of the WQ and RQ pair may be equal to one another in some embodiments, the establishment of the set of queues may also include the setup of buffer memory and appropriate addressing to facilitate DMA operations by the chips with respect to the memory. For instance, the set of queues may be configured to use a payload buffer and header buffer. The RQ payload may contain payload buffer memory addresses where payloads are placed by the source chip and the RQ header may contain header buffer memory addresses where a WQE is created by the source chip with a header descriptor that provides information on a corresponding payload.

Establishment of the queues and memory resources supporting the queues may be completed, at least in part, by a host or driver device. Alternatively or additionally, the queues and memory resource may be setup by a software/firmware routine executed by a host device or driver device. The establishment/setup of the queues and memory resources may facilitate the source chip to directly write information into the queues (step 508) and the destination chip to directly read the information from those queues (step 512). As discussed above, the source and destination chips may utilize DMA operations or the like to directly access the queues and memory resources.

The method 500 may further include optional steps of maintain a Phase State bit to track a state of a current valid phase (step 516). In some embodiments, the Phase State bit may be toggled when at least one queue wraps to a predetermined index (step 520).

Figure 6:
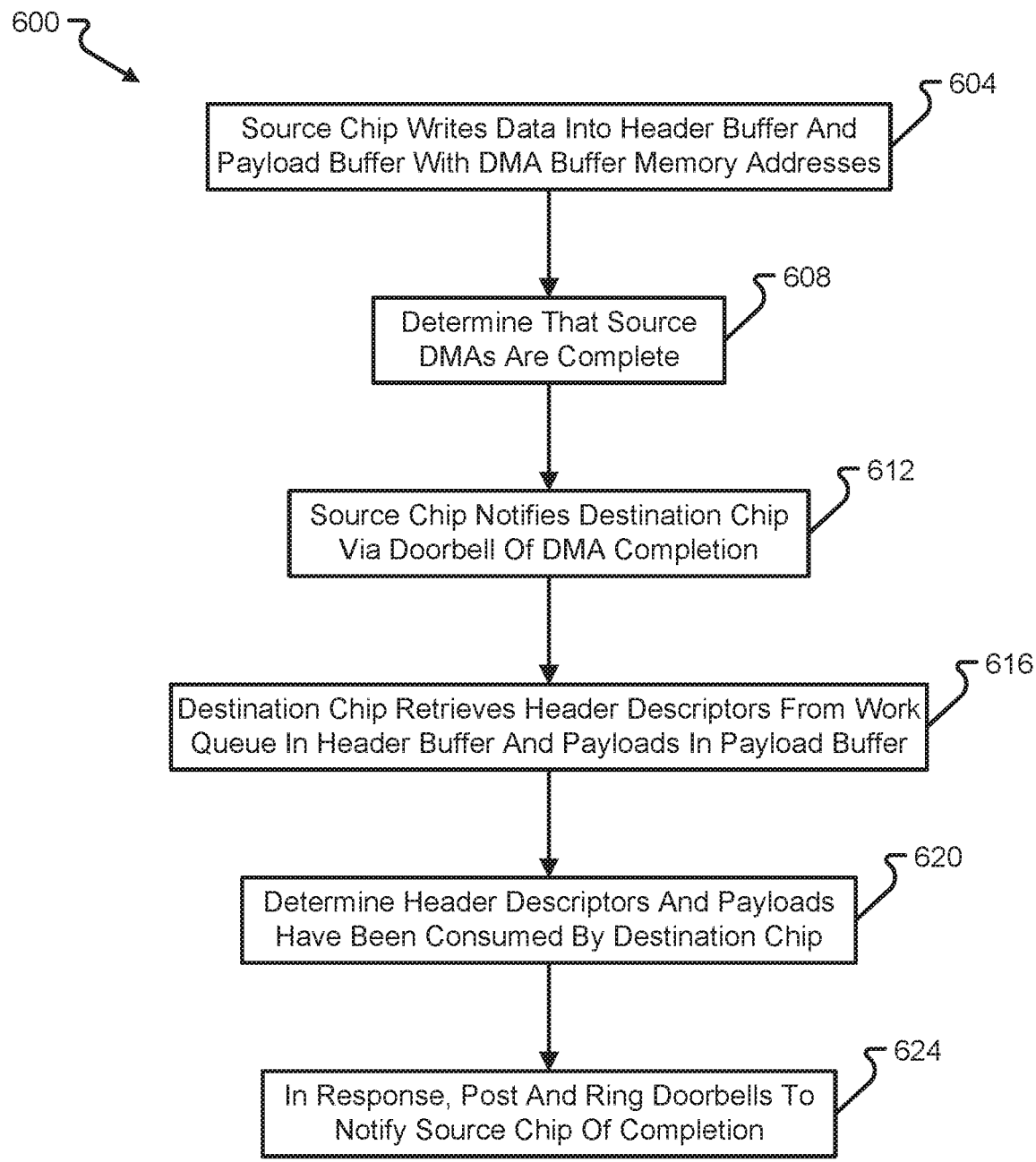
FIG. 6 is a flow diagram depicting another method of enabling chip-to-chip data transmission in accordance with at least some embodiments of the present disclosure.

With reference now to FIG. 6, another method 600 of enabling a data transfer between a data source 108 (e.g., a source chip) and a data destination 112 (e.g., a destination chip) will be described in accordance with at least some embodiments of the present disclosure. As with other methods described herein, this particular method 600 will be described in connection with a particular example of a data source and data destination, but it should be appreciated that the method 600 can be applied to any number of types of different data sources, data destinations, and/or memory types.

The method 600 begins with the source chip writing data into a header buffer and payload buffer using DMA buffer memory addresses (step 604). The source chip will continue writing the data into the appropriate buffer memory devices until the source chip determines that it has completed writing all of the necessary data (step 608). Thereafter, the source chip notifies the destination chip of the DMA completion by use of a doorbell mechanism, for example (step 612). In some embodiments, the source chip rings a WQ doorbell with WQ_ID to the destination chip via a PCIe-posted memory write transaction once data placements into buffer memories are complete. Doorbells are used to communicate queue index updates from one chip to another, which are PCIe-posted memory writes to PCIe DMA addresses. A doorbell may contain, among other things, a Queue ID field and a Number of Entries Posted field or Producer Index field. It should be appreciated that doorbell writes can be coalesced to decrease the number of PCIe transactions to reduce overheads, which allow several WQEs or RQEs to be posted with a single doorbell write transaction.

Upon receiving the doorbell notification, the destination chip begins the process of retrieving the information from memory. In particular, the destination chip retrieves the header descriptors from the WQ in the header buffer and payloads are retrieved from the payload buffer (step 616). The data retrieval may be performed using DMA operations or similar types of memory access mechanisms that bypass the host CPU. The method 600 continues when the destination chip determines that all header descriptors and payloads placed into memory by the source chip have been consumed by the destination chip (step 620). Upon determining that all header descriptors and payloads have been consumed, the destination chip notifies the source chip via a doorbell mechanism, thereby freeing up the queues and memory resources for a different transfer of information (step 624).

Figure 7:
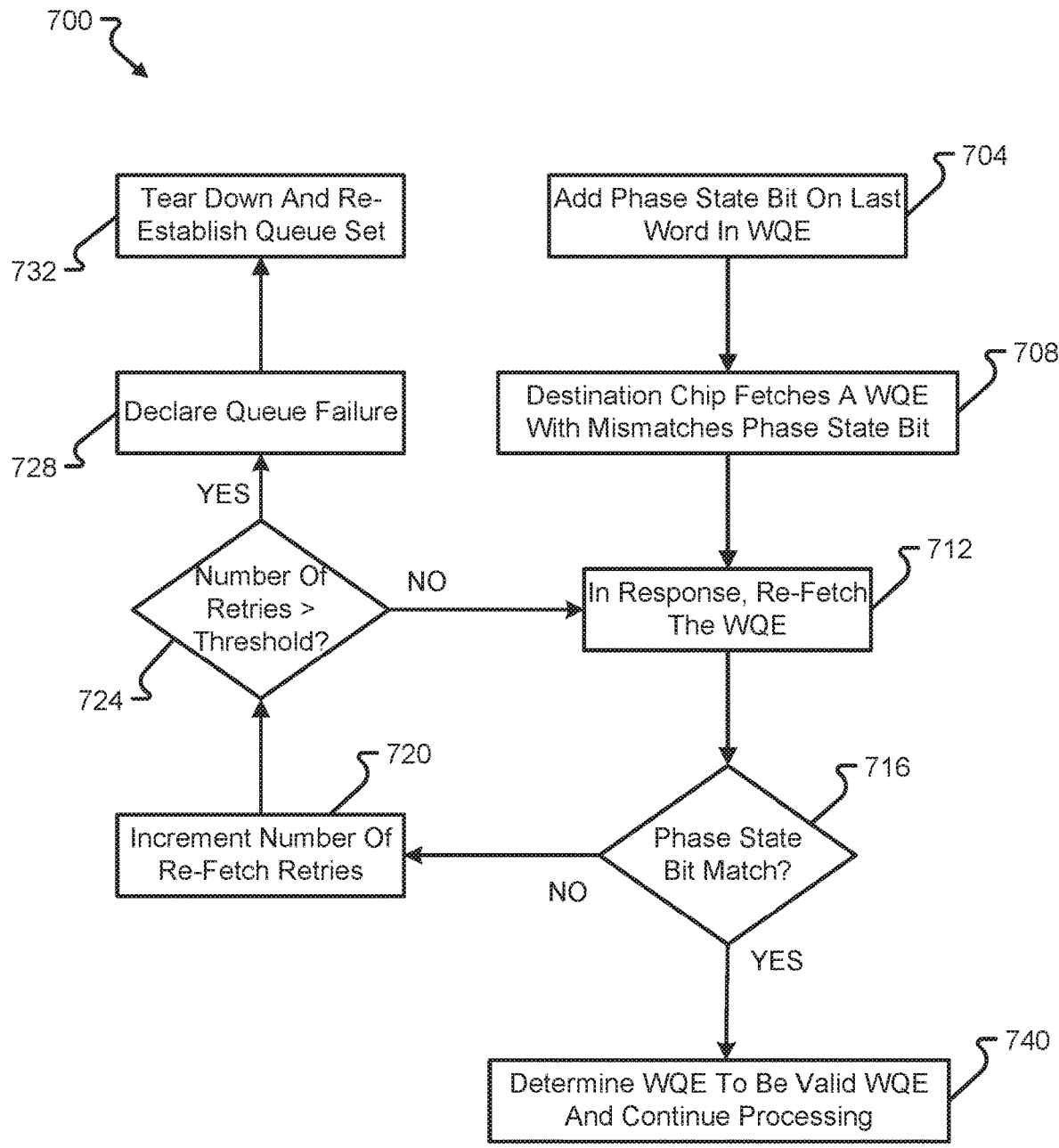
FIG. 7 is a flow diagram depicting a method of using a phase state bit to ensure that valid data is retrieved by a destination chip in accordance with at least some embodiments of the present disclosure.

With reference now to FIG. 7, a method 700 of using a phase state bit to ensure that valid data is retrieved by a destination chip will be described in accordance with at least some embodiments of the present disclosure. The method 700 may be used in any system architecture in which a data source and data destination are exchanging information via DMA operations.

The method 700 begins when a source chip adds a Phase State bit onto a last word in a WQE (step 704). Thereafter, the destination chip fetches a WQE, but the fetched WQE has a Phase State bit that does not match a Phase State bit that was expected by the destination chip (step 708). In some embodiments, step 708 occurs when the destination chip fetches a WQE with a mismatched Phase State bit in WQE (e.g., a Phase State bit fetched by the destination chip does not match with the WQ control structure Phase State bit maintained locally by the destination chip).

The method 700 continues with the destination chip re-fetching the WQE (step 712). This re-fetching process is performed only in response to the destination chip determining that there was a Phase State bit mismatch between the retrieved Phase State bit and the Phase State bit maintained in the WQ control structure. The destination chip then determines if the newly re-retrieved Phase State bit matches the expected Phase State bit maintained in the WQ control structure (step 716). If this query is answered negatively, then the destination chip will increment a local counter that is counting the number of re-fetch retries (step 720). The destination chip will then determine if the current number of re-fetch retries exceeds a predetermined or pre-programmed threshold number of retries (step 724). If the number of retries exceeds the predetermined threshold, then the destination chip will declare a queue failure (step 728). After declaring the queue failure, the queue set will be torn down and a new queue set (e.g., RQ and WQ pair) will be established (step 732).

Referring back to step 724, if the number of retries does not exceed the predetermined threshold, then the method returns to step 712. This will restart the loop of steps 712, 716, 720, and 724. This loop will continue unless and until query 724 is answered affirmatively, as described above, or when the query of step 716 is answered affirmatively. Specifically, if the re-retrieved Phase State bit finally matches the expected value, then the destination chip will determine the WQE to be valid and will continue processing the WQE in the normal fashion.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system that facilitates chip-to-chip transport of header descriptors and payloads, comprising:
 a source chip;
 a destination chip;
 a set of queues describing buffer memory locations for staging the header descriptors and the payloads to be transferred from the source chip to the destination chip, wherein the set of queues are directly accessible to the source chip and to the destination chip; and
 a host device coupled to the source chip and the destination chip and that executes a setup routine to establish the set of queues in a non-host device memory prior to transfer of the header descriptors and the payloads from the source chip to the destination chip, wherein the transfer of the header descriptors and the payloads from the source chip to the destination chip flows through the set of queues in the non-host device memory and bypasses a central processing unit (CPU) of the host device after the set of queues have been established by the host device.

2. The system of claim 1, wherein the set of queues comprises a work queue (WQ), receive queue (RQ) pair, header buffer and payload buffer, wherein the transfer of the header descriptors and the payloads is initiated by a doorbell to the destination chip.

3. The system of claim 2, wherein a queue depth of the WQ and RQ pair is equal.

4. The system of claim 2, wherein the set of queues comprises the payload buffer and the header buffer, wherein an RQ payload contains payload buffer memory addresses where payloads are placed by the source chip, and wherein an RQ header contains header buffer memory addresses where a work queue entry (WQE) is created by the source chip with a header descriptor that provides information on a corresponding payload.

5. The system of claim 4, wherein the information provided in the header descriptor comprises at least one of frame header, optional header, and control attributes.

6. The system of claim 4, wherein the source chip maintains a phase state bit that tracks a state of a current valid phase, wherein the phase state bit is added to a last word in the WQE, and wherein the phase state bit is toggled when the WQ wraps to a predetermined index.

7. The system of claim 1, wherein the source chip rings a work queue (WQ) doorbell with a WQ identifier to the destination chip via a PCIe posted memory write transaction once data placements into the buffer memory locations are complete.

8. The system of claim 1, wherein the buffer memory locations are maintained at the destination chip.

9. The system of claim 1, wherein the buffer memory locations are accessed by the source chip through a network fabric.

10. The system of claim 9, wherein the network fabric comprises a PCIe network fabric, wherein the source chip writes the header descriptors and the payloads directly to the buffer memory locations without assistance from the host device, and wherein the destination chip retrieves the header descriptors and the payloads directly from the buffer memory locations.

11. The system of claim 1, wherein the buffer memory locations are co-located with one or both of the source chip and destination chip.

12. A method of enabling chip-to-chip transport of header descriptors and payloads, the method comprising:
establishing, by a host device prior to transfer of the header descriptors and the payloads from a source chip to a destination chip, a set of queues that describe buffer memory locations in a non-host device memory for staging the header descriptors and the payloads to be transferred from the source chip to the destination chip;
writing, by the source chip after the set of queues is established, the header descriptors and the payloads directly into the buffer memory locations described by the set of queues while bypassing a central processing unit (CPU) of the host device; and
reading, by the destination chip, header descriptors and the payloads directly from the buffer memory locations described by the set of queues while bypassing the CPU of the host device.

13. The method of claim 12, wherein the set of queues comprises a work queue (WQ), receive queue (RQ) pair, header buffer and payload buffer, wherein a queue depth of the WQ and RQ pair is equal, wherein the set of queues comprises the payload buffer and the header buffer, wherein an RQ payload contains payload buffer memory addresses where payloads are placed by the source chip, and wherein an RQ header contains header buffer memory addresses where a work queue entry (WQE) is created by the source chip with a header descriptor that provides information on a corresponding payload.

14. The method of claim 13, further comprising:
maintaining a phase state bit that tracks a state of a current valid phase; and
toggling the phase state bit when the WQ wraps to a predetermined index.

15. The method of claim 12, wherein the source chip rings a work queue (WQ) doorbell with a WQ identifier to the destination chip via a PCIe posted memory write transaction once data placements into the buffer memory locations are complete.

16. The method of claim 12, wherein the buffer memory locations are accessed by the source chip through a network fabric.

17. An adaptor, comprising:
a data source;
a data destination;
buffer memory; and
a set of queues describing buffer memory locations in the buffer memory, wherein the buffer memory provides a location for staging header descriptors and payloads to be transferred from the data source to the data destination, wherein the set of queues are setup by a host device prior to transfer of the header descriptors and the payloads from the data source to the data destination in order to enable direct transfer of the header descriptors and the payloads between the data source and the data destination while bypassing a central processing unit (CPU) of the host device, and wherein the buffer memory is a non-host device buffer memory.

18. The adaptor of claim 17, wherein the set of queues comprises a work queue (WQ), receive queue (RQ) pair, wherein a queue depth of the WQ and RQ pair is equal, wherein the set of queues comprises a payload buffer and a header buffer, wherein an RQ payload contains payload buffer memory addresses where the payloads are placed by the data source, and wherein an RQ header contains header buffer memory addresses where a work queue entry (WQE) is created by the data source with a header descriptor that provides information on a corresponding payload.

19. The adaptor of claim 17, wherein the data source rings a work queue (WQ) doorbell with a WQ identifier to the data destination, wherein the WQ doorbell includes a number of entries posted field or a source destination index field.

20. The adaptor of claim 17, wherein the data source comprises a first port of the adaptor and wherein the data destination comprises a second port of the adaptor.

* * * * *